(12) United States Patent
Shin (10) Patent No.: US 10,259,317 B2
(45) Date of Patent: Apr. 16, 2019

(54) IN-WHEEL WORKING DEVICE

(71) Applicant: HYUNDAI MOBIS Co., Ltd., Seoul (KR)

(72) Inventor: KyeongHo Shin, Bucheon-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 57 days.

(21) Appl. No.: 15/716,445

(22) Filed: Sep. 26, 2017

(65) Prior Publication Data

US 2018/0118022 A1    May 3, 2018

(30) Foreign Application Priority Data

Nov. 1, 2016  (KR) .......................... 10-2016-0144660

(51) Int. Cl.
| | | |
|---|---|---|
| B60K 17/04 | (2006.01) | |
| B60B 27/00 | (2006.01) | |
| B60K 7/00  | (2006.01) | |
| F16H 37/02 | (2006.01) | |
| B60B 27/06 | (2006.01) | |
| F16H 37/04 | (2006.01) | |

(52) U.S. Cl.
CPC ........ B60K 17/046 (2013.01); B60B 27/0052 (2013.01); B60B 27/0063 (2013.01); B60B 27/065 (2013.01); B60K 7/00 (2013.01); B60K 7/0007 (2013.01); F16H 37/041 (2013.01); B60K 2007/0038 (2013.01); B60K 2007/0061 (2013.01)

(58) Field of Classification Search
None
See application file for complete search history.

(56) References Cited

U.S. PATENT DOCUMENTS

| 4,142,615 A * | 3/1979 | Sidles, Jr. ............ B60K 17/046 192/221.1 |
|---|---|---|
| 9,636,999 B2 | 5/2017 | Shin |
| 2004/0080223 A1* | 4/2004 | Shimizu ............... B60K 7/0007 310/75 C |
| 2006/0144626 A1* | 7/2006 | Mizutani ............. B60K 7/0007 180/65.51 |

(Continued)

FOREIGN PATENT DOCUMENTS

| KR | 10-2011-0040459 | 4/2011 |
| KR | 10-2015-0067557 | 6/2015 |
| KR | 10-1655402 | 9/2016 |

*Primary Examiner* — Colby M Hansen
(74) *Attorney, Agent, or Firm* — H.C. Park & Associates, PLC (57) ABSTRACT

An in-wheel working device may include a motor part configured to generate power, a first speed reduction part including a sun gear connected to a driving shaft of the motor part and configured to rotate with the driving shaft, a planetary gear configured to rotate along a circumference of the sun gear, and a carrier configured to rotate with the planetary gear, a second speed reduction part installed in series to the first speed reduction part, and configured to perform speed reduction through a gear ratio while rotating with the carrier axially connected to the second speed reduction part, a hub part spline-coupled to the second speed reduction part, and configured to rotate with the second speed reduction part, and a wheel member connected to the hub part, and configured to rotate with the hub part.

14 Claims, 5 Drawing Sheets

(56) References Cited

U.S. PATENT DOCUMENTS

| | | | |
|---|---|---|---|
| 2007/0078035 A1* | 4/2007 | Oshidari | B60K 7/0007 475/149 |
| 2008/0036284 A1* | 2/2008 | Murata | B60K 7/0007 301/6.5 |
| 2009/0133944 A1* | 5/2009 | Nishioka | B60G 3/20 180/65.51 |

* cited by examiner

IN-WHEEL WORKING DEVICE

CROSS-REFERENCES TO RELATED APPLICATION

This application claims priority from and the benefit of Korean Patent Application No. 10-2016-0144660, filed on Nov. 1, 2016, which is hereby incorporated by reference for all purposes as if set forth herein.

BACKGROUND

Field

Exemplary embodiments relate to an in-wheel working device. More particularly, exemplary embodiments relate to an in-wheel working device which is capable of implementing a compact two-stage speed reduction device, thereby reducing the size of a motor while doubling a driving force.

Discussion of the Background

The exhaustion of fossil fuels has promoted development of electric vehicles which are propelled by a motor using electric energy stored in a battery, instead of engines using the fossil fuels such as gasoline and diesel.

The electric vehicles are divided into a pure electric vehicle that is propelled by motor using only electric energy stored in a rechargeable battery, a solar cell vehicle that is propelled by a motor using a photoelectric cell, a fuel cell vehicle that is propelled by a motor using a fuel cell using hydrogen fuel, and a hybrid vehicle that is propelled by an engine and motor by driving the engine using fossil fuel and driving the motor using electricity.

In general, an in-wheel working device is a technique used for a vehicle, such as an electric vehicle that uses electricity as a power source. Unlike a system that rotationally drives a wheel using power transfer through an engine, transmission, and drive shaft of a gasoline or diesel vehicle, the in-wheel working device directly transfers power to the wheels using motors disposed in the drive wheel.

The conventional in-wheel working device has a large motor diameter to increase a drive torque without a speed reducer. Thus, the wheel size is inevitably increased. Therefore, there is a demand for a structure capable of solving the problem.

The above information disclosed in this Background section is only for enhancement of understanding of the background of the invention and, therefore, it may contain information that does not constitute prior art.

SUMMARY

Exemplary embodiments of the present invention provide an in-wheel working device which is capable of implementing a compact two-stage speed reduction device, thereby reducing the size of a motor while multiplying a driving force.

Additional features of the invention will be set forth in the description which follows, and in part will be apparent from the description, or may be learned by practice of the invention.

In an embodiment, an in-wheel working device may include a motor part configured to generate power, a first speed reduction part including a sun gear connected to a driving shaft of the motor part and configured to rotate with the driving shaft, a planetary gear configured to rotate along a circumference of the sun gear, and a carrier configured to rotate with the planetary gear, a second speed reduction part installed in series to the first speed reduction part, and configured to perform speed reduction through a gear ratio while rotating with the carrier axially connected to the second speed reduction part, a hub part spline-coupled to the second speed reduction part, and configured to rotate with the second speed reduction part, and a wheel member connected to the hub part, and configured to rotate with the hub part.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise," "configure," "have," or the like, which are described herein, will be understood to imply the inclusion of the stated components, and therefore should be construed as including other components, and not the exclusion of any other elements.

Embodiments of the invention will hereinafter be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
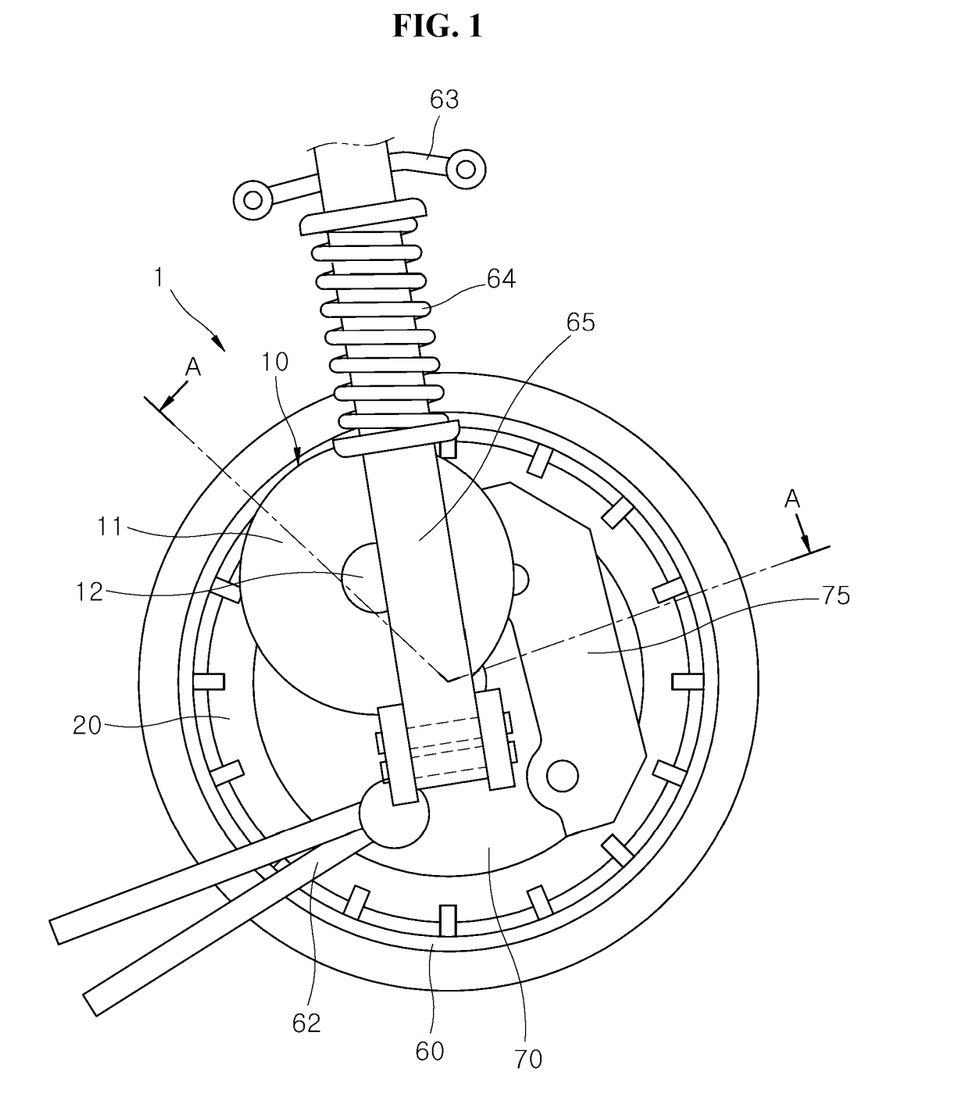
FIG. 1 is a schematic front view of an in-wheel working device in accordance with an embodiment of the present invention.
Figure 2:
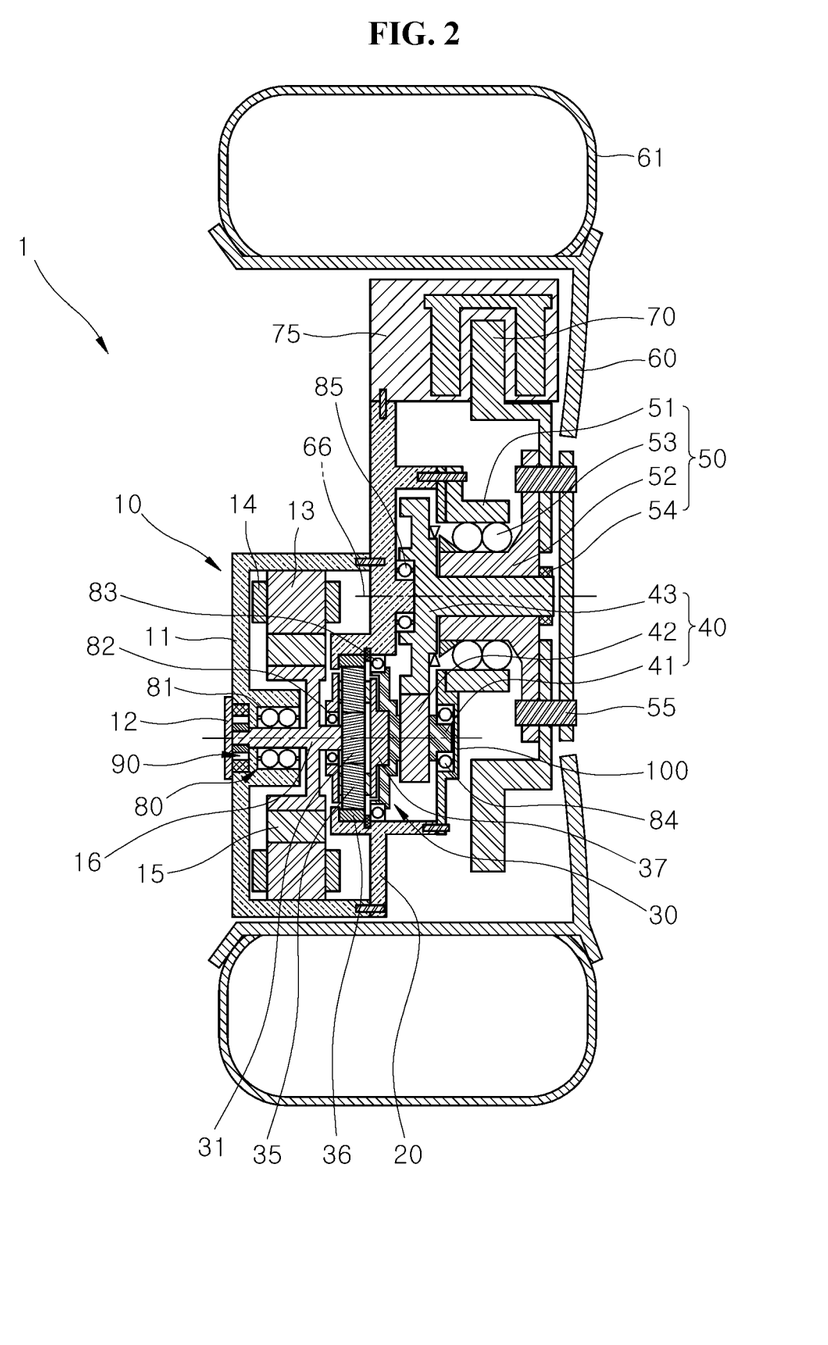
FIG. 2 is a schematic cross-sectional view of the in-wheel working device, taken along the line A-A of FIG. 1.
Figure 3:
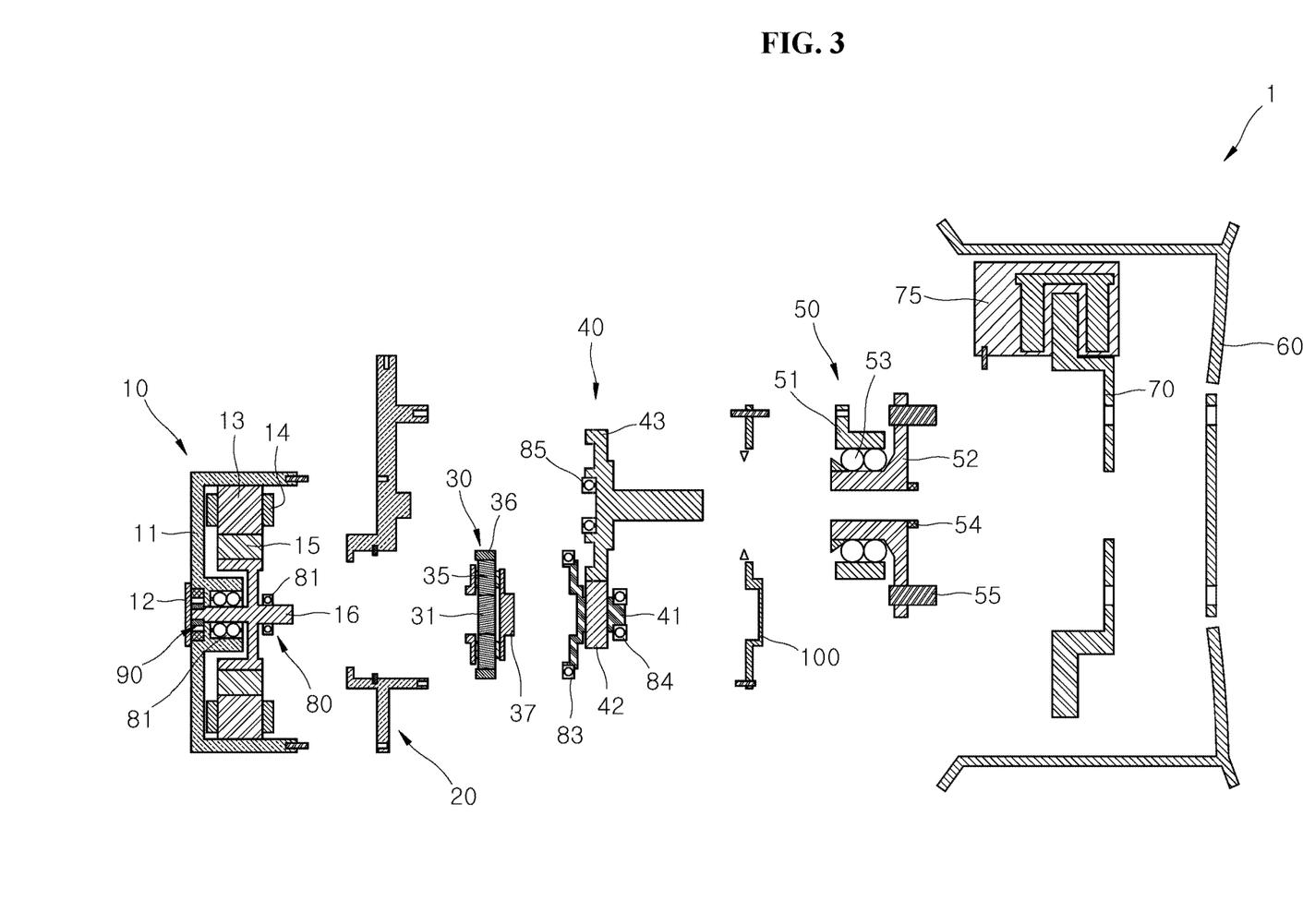
FIG. 3 is an exploded perspective view of main parts of the in-wheel working device in accordance with the embodiment of the present invention.
Figure 4:
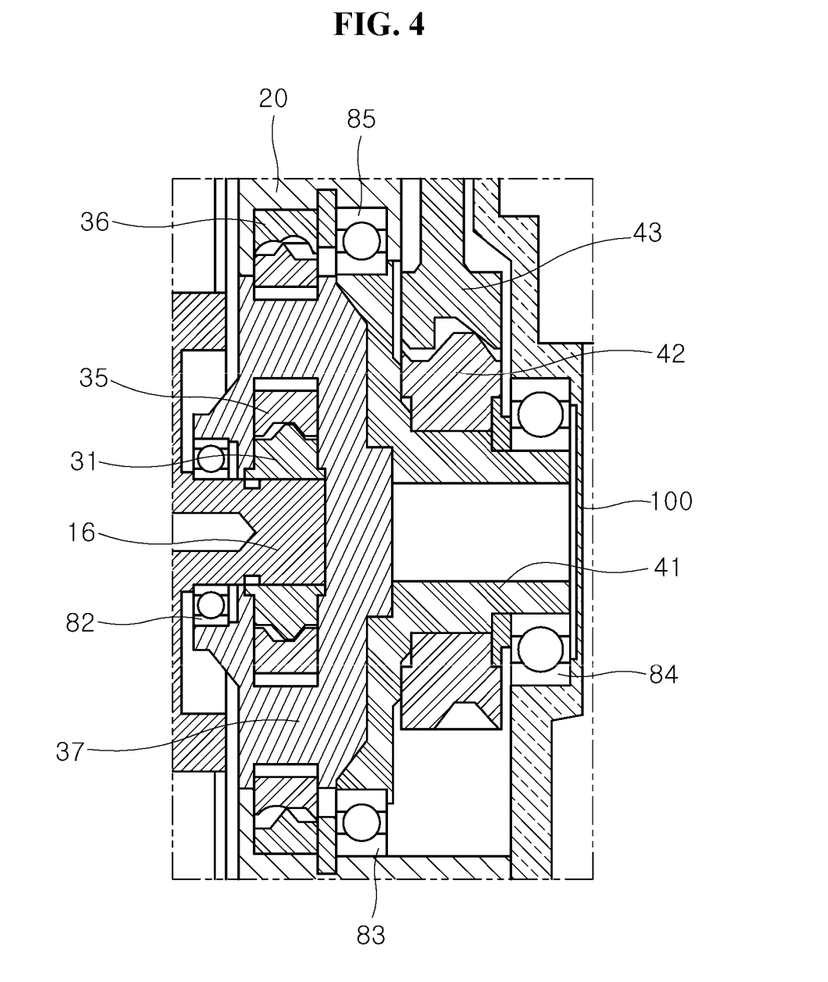
FIG. 4 is a cross-sectional view illustrating that a sun gear in accordance with an embodiment of the present invention is installed.
Figure 5:
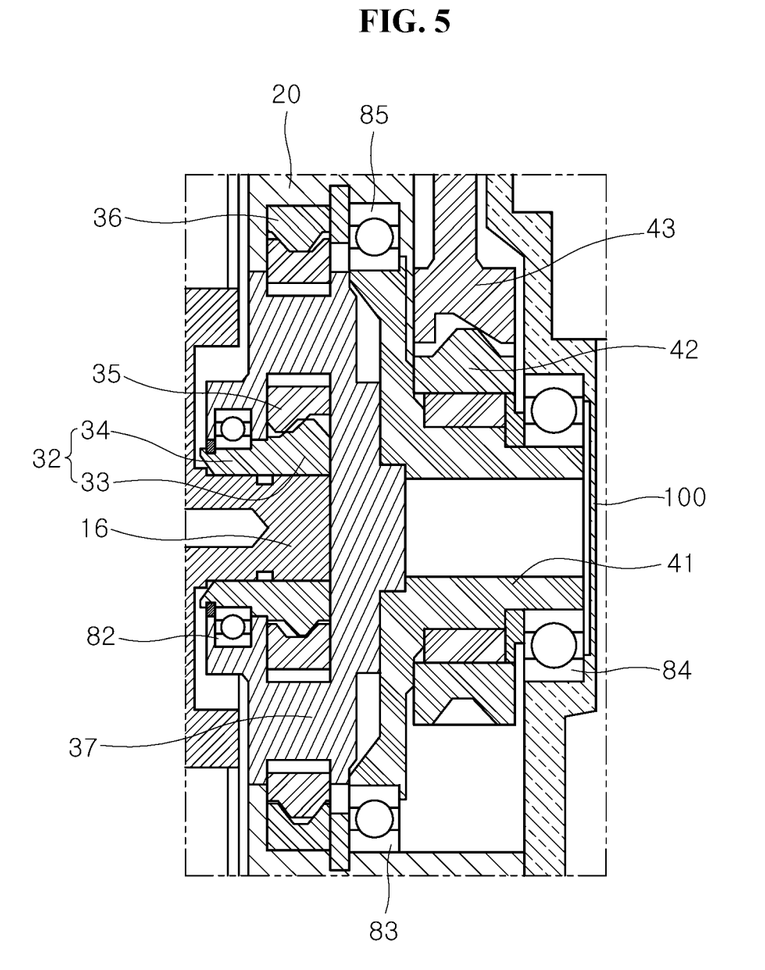
FIG. 5 is a cross-sectional view illustrating that a sun gear in accordance with another embodiment of the present invention is installed.

FIG. 1 is a schematic front view of an in-wheel working device in accordance with an embodiment of the present invention, FIG. 2 is a schematic cross-sectional view of the in-wheel working device, taken along the line A-A of FIG. 1, FIG. 3 is an exploded perspective view of main parts of the in-wheel working device in accordance with the embodiment of the present invention, FIG. 4 is a cross-sectional view illustrating that a sun gear in accordance with an embodiment of the present invention is installed, and FIG. 5 is a cross-sectional view illustrating that a sun gear in accordance with another embodiment of the present invention is installed.

As illustrated in FIGS. 1-5, the in-wheel working device 1 in accordance with the embodiment of the present invention may include a motor part 10, a housing part 20, a first speed reduction part 30, a second speed reduction part 40, a hub part 50, a wheel member 60, a braking disk 70, a bearing part 80, a resolver 90 and a speed reducer cover 100.

The motor part 10 may include various types of driving devices as long as they can generate power to rotate the wheel member 60.

The center axis of the motor part 10 may be set at a position separated by a preset distance from the rotational center axis 66 of the wheel member 60. Therefore, the position of the motor part 10 may secure the maximum size of the motor part 10 while avoiding an interference with a chassis part during driving. As illustrated in FIG. 1, the motor part 10 may be located at the front top of the wheel member 60, which makes it possible to increase the degree of freedom when a suspension such as a lower arm 62 is disposed at the bottom of the wheel member 60.

Furthermore, a caliper part for restricting rotation of the braking disk 70 may be installed at the opposite side of the motor part 10 in the wheel member 60. Therefore, when the in-wheel working device 1 in accordance with the present embodiment is seen from the inside of the vehicle, the center of the motor part 10 may be set at a position separated by a preset distance from the rotational center axis 66 of the wheel member 60 toward the front side (left side in FIG. 1). Thus, the caliper part may be located at the upper portion of the rear side (right side in FIG. 1) of the wheel member 60. Furthermore, an upper arm 63 and the like may be installed at the top of the rotational center axis 66 corresponding to the axle center, and a lower arm 62 and the like may be installed at the bottom of the rotational center axis 66.

The motor part 10 in accordance with the present embodiment may include a motor housing 11, a motor cover 12, a stator core 13, a stator coil 14, a rotor core 15, and a driving shaft 16.

The motor housing 11 protruding to the outside of the housing part 20 may be installed in a shape protruding in the lateral direction of the wheel member 60. The motor housing 11 may have a hole formed in the center thereof, and the motor cover 12 may open/close the hole formed in the motor housing 11.

In the motor housing 11, the stator core 13, the stator coil 14, the rotor core 15 and the driving shaft 16 may be installed. The stator core 13 may be fixed along the inner sidewall of the motor housing 11, and the stator coil 14 may be installed outside the stator core 13. The stator core 13 may be installed in the circumferential direction along the motor housing 11, and the rotor core 15 may be installed in the stator core 13.

The rotor core 15 may be rotated by a power supply, and the driving shaft 16 may be connected to the inside of the rotor core 15, and rotated with the rotor core 15.

When the motor part 10 is a three-phase motor, the stator coil 14 may include a U-phase coil, a V-phase coil, and a W-phase coil. The rotor core 15 may be disposed at the inner circumference of the stator core 13 and the stator coil 14, and supported by a double ball bearing 81 so as to rotate relative to the motor housing 11.

The resolver 90 may be mounted behind the double ball bearing 81, and transmit location information for motor control to an inverter serving as a control unit.

A rotation output of the rotor core 15 may be transferred to the wheel member 60 through the driving shaft 16, the first speed reduction part 30, the second speed reduction part 40, and the hub part 50. Since a speed reduction device used in the in-wheel working device 1 includes the first speed reduction part 30 serving as a planetary gear speed reducer and the second speed reduction part 40 serving as a counter gear, two-stage speed reduction may be performed.

The driving shaft 16 installed in the rotor core 15 may be rotated with the rotor core 15, and the rotation of the driving shaft 16 may be measured by the resolver 90 while one side (left side in FIG. 2) of the driving shaft 16 is supported by the double ball bearing 81. The other side (right side in FIG. 2) of the driving shaft 16 may be connected to a sun gear 31 of the first speed reduction part 30 and rotate the sun gear 31.

The motor housing 11 of the motor part 10 may be fixed to a side surface of the housing part 20 fixed to the vehicle body. The housing part 20 may be formed in a plate shape, and installed in a shape surrounding the side of the first speed reduction part 30.

The first speed reduction part 30 may include the sun gear 31, a planetary gear 35, a carrier 37, and a ring gear 36. The sun gear 31 may be rotated in connection with the driving shaft 16 of the motor part 10, the planetary gear 35 may be rotated along the circumference of the sun gear 31, the carrier 37 may be rotated with the planetary gear 35 while rotatably supporting the planetary gear 35, and the ring gear 36 may be installed outside the planetary gear 35.

As illustrated in FIG. 2, the first speed reduction part 30 including a planetary gear set may be disposed closer to the outside of the vehicle (right side in FIG. 2) than the motor part 10. The rotational center of the first speed reduction part 30 including a planetary gear set may be disposed on the same axis line as the driving shaft 16 of the motor part 10.

The sun gear 31 may be spline-coupled to the driving shaft 16, and the ring gear 36 may be inserted into the housing part 20 and restricted from rotating. The ring gear 36 may have a plurality of grooves or protrusions formed at the outside thereof, and the housing part 20 facing the ring gear 36 may have protrusions or grooves corresponding to those of the ring gear 36. Thus, the ring gear 36 may be coupled to the housing part 20 and restricted from rotating. Furthermore, since a snap ring may be installed at the other side of the ring gear 36, an axial motion of the ring gear 36 may be restricted. Therefore, since the sun gear 31 may be rotated in connection with the motor part 10 while the ring gear 36 may be fixed, the carrier 37 may be rotated while the speed thereof may be reduced.

Since one side of the carrier 37 (left side in FIG. 2) may be supported by a first bearing 82 of the bearing part 80, a frictional force generated during the rotation of the carrier 37 may be reduced. The first bearing 82 may be installed between the driving shaft 16 and the carrier 37, and the driving shaft 16 may be fastened to the center of the sun gear 31, such that the sun gear 31 may be rotated with the driving shaft 16.

The planetary gear 35 may be engaged with the outside of the sun gear 31 so as to revolve and rotate, and the carrier 37 which rotatably supports the planetary gear 35 may be rotated with the planetary gear 35.

The ring gear 36 may be located outside the planetary gear 35, fixed to the housing part 20 which may be coupled to the motor part 10 while surrounding the outside of the first speed reduction part 30, and restricted from rotating.

The second speed reduction part 40 may be installed in series to the first speed reduction part 30, and include various types of speed reduction devices as long as the second speed reduction part 40 can perform speed reduction through a gear ratio while rotated with the carrier 37 axially-connected thereto. The second speed reduction part 40 in accordance with the present embodiment may include a small-diameter gear shaft 41, a small-diameter gear 42, and a large-diameter gear 43. The small-diameter gear shaft 41 may be axially coupled to the carrier 37, the small-diameter gear 42 may be installed in a ring shape outside the small-diameter gear shaft 41 and rotated with the small-diameter gear shaft 41, and the large-diameter gear 43 may be engaged and rotated with the small-diameter gear 42 and have a larger diameter than the small-diameter gear 42.

The second speed reduction part 40 including a counter gear set may be disposed closer to the outside of the vehicle (right side in FIG. 2) than the first speed reduction part 30 using the planetary gear 35, and include the small-diameter gear 42 coupled to the small-diameter gear shaft 41 and the large-diameter gear 43 engaged with a hub inner race 52. The small-diameter gear shaft 41 may be coupled to the carrier 37 of the first speed reduction part 30 so as to receive power. One side of the small-diameter gear shaft 41 may be supported by a second bearing 83, and the other side of the small-diameter gear shaft 41 may be supported by a third bearing 84. The second bearing 83 may be located between the housing part 20 and the small-diameter gear shaft 41, and the third bearing 84 may be located between the small-diameter gear shaft 41 and a speed reducer cover 100 coupled to the housing part 20.

The carrier 37 and the small-diameter gear shaft 41 may be coupled to each other in the radial inside of the second bearing 83. Such a structure may increase the space utilization, thereby improving the flexibility of design in the in-wheel working device 1.

The carrier 37 and the small-diameter gear shaft 41 may be formed as separate members, and connected through various shaft connection methods as long as the carrier 37 and the small-diameter gear shaft 41 can be axially connected through spline coupling to transfer power.

Since the carrier 37 and the small-diameter gear shaft 41 may be formed as separate members and spline-coupled to each other, a load transferred in the axial direction of the small-diameter gear shaft 41 can be prevented from being transferred to the carrier 37. Therefore, such a structure can not only prevent a deformation of the carrier 37 by a load generated through the second speed reduction part 40, but also prevent an abnormal gear meshing which may be caused by an axial misalignment of the planetary gear 35 supported by the carrier 37. Furthermore, the structure may prevent a reduction in durability of the first speed reduction part 30 while reducing operation noise of the planetary gear 35.

When the small-diameter gear shaft 41 may be deformed by an external load, the carrier 37 spline-coupled to the small-diameter gear shaft 41 may be minimally influenced by the deformation of the small-diameter gear shaft 41, and thus improve the operation reliability and durability of the first speed reduction part 30.

The small-diameter gear 42 may be installed outside the small-diameter gear shaft 41, and the large-diameter gear 43 engaged with the small-diameter gear 42 may implement a speed reduction output through a gear ratio. Between the large-diameter gear 43 and the housing part 20, a fourth bearing 85 may be installed to perform a function of guiding a regular position when the large-diameter gear 43 may be assembled. One side of the large-diameter gear 43 may be supported by the fourth bearing 85, and the other side of the large-diameter gear 43 may be spline-coupled to the hub inner race 52 of the hub part 50, and then fixed by a fixing nut 54.

When power is transferred from the motor part 10, the first speed reduction part 30 including the planetary gear 35 may increase a primary torque, and the power may be transferred to the second speed reduction part 40 through the carrier 37 so as to increase a secondary torque. At this time, when the small-diameter gear shaft 41 is deformed by a force generated while the small-diameter gear 42 is engaged and rotated with the large-diameter gear 43, an influence on the carrier 37 by the deformation of the small-diameter gear shaft 41 can be reduced because the small-diameter gear shaft 41 and the carrier 37 are not formed as one body but detachably connected to each other. Furthermore, while the axial stiffness of the small-diameter gear shaft 41 is secured to reduce an influence on the carrier 37 by the small-diameter gear shaft 41, a tooth modification may be applied to smoothly perform gear meshing, when the small-diameter gear 42 and the large-diameter gear 43 are designed.

The hub part 50 may be spline-coupled to the second speed reduction part 40, and formed in various shapes as long as the hub part 50 can rotate the wheel member 60 while being rotated with the second speed reduction part 40. The hub part 50 in accordance with the present embodiment may include a hub outer race 51, a hub inner race 52, and a hub bearing 53. The hub outer race 51 may be fixed to the housing part 20 and restricted from rotating, the hub inner race 52 may be spline-coupled to the large-diameter gear 43 so as to receive rotation power, and connected to the wheel member 60 so as to rotate with the wheel member 60, and the hub bearing 53 may be located between the hub outer race 51 and the hub inner race 52.

The hub outer race 51 may be formed in a pipe shape, and fixed to the housing part 20. The hub bearing 53 may be installed in the hub outer race 51, and the hub inner race 52 may be rotatably installed in the hub bearing 53. The hub inner race 52 may be spline-coupled to the large-diameter gear 43 so as to receive rotation power. The large-diameter gear 43 spline-coupled to the hub inner race 52 may be fastened to the fixing nut 54 at the other side of the hub inner race 52.

The hub part 50 may receive a torque which may be increased while the hub inner race 52 is spline-coupled to the large-diameter gear 43 of the second speed reduction part 40 including the counter gear and secondarily decelerated, and transfer the received torque to the wheel member 60. The hub outer race 51 may be installed in a shape surrounding the hub inner race 52, and fixed to the housing part 20 through a bolt so as to rotatably support the hub inner race 52. Between the large-diameter gear 43 and the housing part 20, a seal may be installed to block an oil leakage.

The hub inner race 52 and the wheel member 60 may be fixed through a hub bolt 55. Thus, when the hub inner race 52 is rotated, the wheel member 60 may be rotated together.

A tire 61 may be installed along the outer circumference of the wheel member 60 which may be connected to the hub inner race 52 and rotated with the hub inner race 52. The lower arm 62 may be installed at the bottom of the rotational center axis 66 of the wheel member 60, and the upper arm 63 may be installed at the top of the rotational center axis 66. Furthermore, a buffer spring 64 may be installed at the top of a damper 65 which may be installed in a vertical direction at a side surface of the wheel member 60, and absorb a shock generated during driving.

The braking disk 70 may be connected to the hub inner race 52 and rotated with the hub inner race 52, and the caliper part 75 may be installed in the housing part 20 and generate a braking force while coming in contact with the braking disk 70. Therefore, the disk-type braking device can be installed in the in-wheel working device 1 without a design change of front-wheel and rear-wheel suspensions.

The bearing part 80 may include various types of bearings as long as they can reduce friction when the motor part 10 and the first and second speed reduction parts 30 and 40 are rotated. The bearing part 80 in accordance with the present embodiment may include the double ball bearing 81, the first bearing 82, the second bearing 83, the third bearing 84, and the fourth bearing 85.

The first bearing 82 may be located between the driving shaft 16 and the carrier 37, and reduce friction between the driving shaft 16 and the carrier 37. The first bearing 82 may serve to guide the motor part 10 and the first speed reduction part 30 including the planetary gear 35, such that the motor part 10 and the first speed reduction part 30 are coaxially maintained.

The second and third bearings 83 and 84 may be support the small-diameter gear shaft 41. The second bearing 83 may be installed at one side of the small-diameter gear shaft 41, and the third bearing 84 may be installed at the other side of the small-diameter gear shaft 41.

The fourth bearing 85 may be installed between the large-diameter gear 43 and the housing part 20, and guide the rotation of the large-diameter gear 43.

The resolver installed on the driving shaft 16 of the motor part 10 may serve as a sensor for measuring the position of the rotor core 15 corresponding to a rotor of the motor part 10. Since the resolver 90 may have higher mechanical strength and durability than an encoder, the resolver 90 may be used as a position sensor of the motor part 10 in various fields such as an electric vehicle, robot, airplane and military device, which require high performance and high precision.

The speed reducer cover 100 may be coupled to the housing part 20 so as to support the third bearing 84, and a rotating seal may be mounted to prevent an oil leakage in the second speed reduction part 40.

As illustrated in FIG. 5, a sun gear 32 in accordance with another embodiment of the present invention may include a sun gear body 33 and an extension protrusion 34. The sun gear body 33 may be located between the driving shaft 16 and the planetary gear 35, and the extension protrusion 34 may be extended from the sun gear body 33 and located between the driving shaft 16 and the first bearing 82.

The extension protrusion 34 of the sun gear 32 may be located in an empty space between the carrier and the driving shaft 16, and the first bearing 82 may be then installed between the extension protrusion 34 and the carrier. Therefore, since an axial force generated by the sun gear 32 is not transferred to the double ball bearing 81 of the motor part 10 (see FIG. 2), the lifetime of the double ball bearing 81 can be extended, and stress transferred to the driving shaft 16 can be distributed to improve the durability of the driving shaft 16.

Hereafter, the operation of the in-wheel working device 1 in accordance with the embodiment of the present invention will be described in detail with reference to the accompanying drawings.

When a current is applied to the inverter, the current may be transferred to the stator coil to form a magnetic field. The magnetic field may rotate the rotor core 15, and the torque of the rotor core 15 may be transferred to the sun gear 31 of the first speed reduction part 30 along the driving shaft 16.

Since the driving shaft 16 may be supported by the double ball bearing 81 and the driving shaft 16 and the sun gear 31 are spline-coupled to each other, the durability may be improved, and the disassembling operation may be simplified to reduce the maintenance cost.

Since the sun gear 31 may be rotated and the ring gear 36 may be fixed, deceleration rotation through the carrier 37 may be performed. Since the carrier 37 may be supported by the first bearing 82, a power loss may be reduced. Since the carrier 37 and the small-diameter gear shaft 41 may be axially coupled, the rotation power of the carrier 37 may be transferred to the small-diameter gear shaft 41.

While the small-diameter gear 42 is rotated with the small-diameter gear shaft 41, the large-diameter gear 43 may also be rotated. When the large-diameter gear 43 is rotated while being decelerated by the gear ratio, the hub inner race 52 spline-coupled to the large-diameter gear 43 may be rotated to rotate the wheel member 60.

Hereafter, a process in which a load generated from the road is transferred to the vehicle body through the in-wheel working device 1 will be described.

A load generated while the vehicle travels on the road may be transferred to the wheel member 60. The load transferred to the wheel member 60 may be transferred to the hub inner race 52, and then transferred to the housing part 20 through the hub bearing 53 and the hub outer race 51. The load transferred to the housing part 20 may be transferred to the vehicle body, after vibration or the like is attenuated by the lower arm 62 and the upper arm 63.

The in-wheel working device 1 in accordance with the embodiment of the present invention may be assembled in the following order.

The stator core 13 and the stator coil 14 may be fixed to the motor housing 11, and the double ball bearing 81 may be then installed. At the same time, the rotor core 15 may be fixed to the outside of the driving shaft 16, and the resolver 90 may be then installed at the outside of the driving shaft 16. Furthermore, the driving shaft 16 to which the resolver 90 is fastened may be installed in the motor housing 11 so as to assemble the module of the motor part 10.

The motor part 10 may be fixed to the side surface of the housing part 20, and then connected to the first speed reduction part 30 including the planetary gear 35. The carrier 37 of the first speed reduction part 30 and the small-diameter gear shaft 41 of the second speed reduction part 40 may be connected to each other, and the large-diameter gear 43 may be then connected to the small-diameter gear 42.

After the large-diameter gear 43 is coupled, the speed reducer cover 100 may be connected to the housing part 20 so as to stably support the small-diameter gear shaft 41.

After the hub part 50 connected to the large-diameter gear 43 is installed, the braking disk 70 and the wheel member 60 may be connected to the hub inner race 52 such that the braking disk 70 and the wheel member 60 are rotated with the hub inner race 52. The in-wheel working device 1 may be disassembled in the reverse order of the assembling process.

In accordance with the present embodiment, the first speed reduction part 30 connected to the motor part 10 may perform speed reduction, and the second speed reduction part 40 may then perform speed reduction. Thus, since a compact two-stage speed reduction device can be implemented, the size of the motor can be reduced while the driving force thereof may be doubled, which makes it possible to improve the flexibility of design. Furthermore, since the carrier 37 of the first speed reduction part 30 and the small-diameter gear shaft 41 of the second speed reduction part 40 are detachably installed, the stiffness can be secured while an axial deformation is reduced.

Furthermore, the in-wheel working device 1 in accordance with the present embodiment may constitute a compact two-stage speed reduction device, and thus reduce the size of the motor part 10 while doubling the driving force. Furthermore, the motor part 10 may be eccentrically disposed at the upper portion of the front side of the vehicle, and mounted on a double wishbone or MacPherson strut, and an existing disk brake can be used. The size reduction of the in-wheel working device 1 can improve the flexibility of design of the vehicle, and facilitate the maintenance operation. Furthermore, since a compact design can be achieved in the wheel member 60, the compatibility with existing chassis parts can be improved to facilitate the assembling process.

Furthermore, since the speed reduction may be primarily and secondarily performed, the selection range of a speed reduction ratio can be widened. Thus, the weight of the in-wheel working device 1 can be reduced through the optimal design.

Furthermore, since the motor part 10 and the first speed reduction part 30 including the planetary gear 35 are located at the top of the rotational center axis 66 of the wheel member 60, an interference with a chassis part can be reduced. Since the first speed reduction part 30 performing the primary speed reduction may be disposed in the motor part 10, a separate housing for the first speed reduction part 30 may not be required to reduce the weight and size of the in-wheel working device 1.

Furthermore, since the second speed reduction part 40 used for the secondary speed reduction may be connected to the hub part 50 like an existing drive shaft of a front wheel, the hub part 50 can be used without a change of the hub bolt 55. Thus, the existing wheel member 60 can be just used to reduce the manufacturing cost.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the disclosure as disclosed in the accompanying claims. In addition, such modifications should also be understood to fall within the scope and spirit of the present disclosure.

What is claimed is:

1. An in-wheel working device, comprising:
   a motor part configured to generate power;
   a first speed reduction part comprising a sun gear connected to a driving shaft of the motor part and configured to rotate with the driving shaft, a planetary gear configured to rotate along a circumference of the sun gear, and a carrier configured to rotate with the planetary gear;
   a second speed reduction part installed in series to the first speed reduction part, and configured to perform speed reduction through a gear ratio while rotating with the carrier axially connected to the second speed reduction part;
   a hub part spline-coupled to the second speed reduction part, and configured to rotate with the second speed reduction part; and
   a wheel member connected to the hub part, and configured to rotate with the hub part.

2. The in-wheel working device of claim 1, wherein a center axis of the motor part is installed at a position separated by a preset distance from a rotational center axis of the wheel member.

3. The in-wheel working device of claim 1, wherein the first speed reduction part comprises a ring gear located outside the planetary gear, and the ring gear is fixed to a housing part which is restricted from rotating and is coupled to the motor part while surrounding the outside of the first speed reduction part.

4. The in-wheel working device of claim 3, wherein the first speed reduction part is disposed closer to the outside of a vehicle than the motor part, and a rotational center of the first speed reduction part is disposed in the same axis line as the driving shaft of the motor part.

5. The in-wheel working device of claim 3, wherein the second speed reduction part comprises:
   a small-diameter gear shaft axially coupled to the carrier;
   a small-diameter gear installed in a ring shape outside the small-diameter gear shaft and configured to rotate with the small-diameter gear shaft; and
   a large-diameter gear having a larger diameter than the small-diameter gear and configured to engage and rotate with the small-diameter gear.

6. The in-wheel working device of claim 5, wherein the second speed reduction part is disposed closer to the outside of a vehicle than the first speed reduction part.

7. The in-wheel working device of claim 5, wherein the hub part comprises:
   a hub outer race fixed to the housing part and restricted from rotating;
   a hub inner race spline-coupled to the large-diameter gear, configured to receive rotation power from the large-diameter gear, connected to the wheel member, and configured to rotate with the wheel member; and
   a hub bearing located between the hub outer race and the hub inner race.

8. The in-wheel working device of claim 7, further comprising:
   a braking disk connected to the hub inner race, and configured to rotate with the hub inner race; and a caliper part installed in the housing part, and configured to generate a braking force while coming in contact with the braking disk.

9. The in-wheel working device of claim 5, wherein the carrier and the small-diameter gear shaft are formed as separate members, and axially connected to each other by a spline coupling.

10. The in-wheel working device of claim 5, further comprising a bearing part configured to reduce friction when the motor part, the first speed reduction part, and the second speed reduction part are rotated.

11. The in-wheel working device of claim 10, wherein the bearing part comprises a first bearing, located between the driving shaft and the carrier, configured to reduce friction between the driving shaft and the carrier.

12. The in-wheel working device of claim 11, wherein the sun gear comprises:
   a sun gear body located between the driving shaft and the planetary gear; and
   an extension protrusion extended from the sun gear body and located between the driving shaft and the first bearing.

13. The in-wheel working device of claim 11, wherein the bearing part comprises:
   a second bearing located between the housing part and the small-diameter gear shaft, and configured to support a first side of the small-diameter gear shaft; and
   a third bearing located between the small-diameter gear shaft and a speed reducer cover coupled to the housing part, and configured to support a second side of the small-diameter gear shaft.

14. The in-wheel working device of claim 13, wherein the bearing part further comprises a fourth bearing located between the housing part and the large-diameter gear, and configured to support one side of the large-diameter gear.

* * * * *